(12) United States Patent
Wentzlaff et al.

(10) Patent No.: US 8,677,081 B1
(45) Date of Patent: Mar. 18, 2014

(54) TRANSFERRING AND STORING DATA IN MULTICORE AND MULTIPROCESSOR ARCHITECTURES

(75) Inventors: David M. Wentzlaff, Cambridge, MA (US); Matthew Mattina, Boylston, MA (US); Anant Agarwal, Weston, MA (US)

(73) Assignee: Tilera Corporation, Westborough, MA (US)

( * ) Notice: Subject to any disclaimer, the term of this patent is extended or adjusted under 35 U.S.C. 154(b) by 91 days.

(21) Appl. No.: 13/211,065

(22) Filed: Aug. 16, 2011

Related U.S. Application Data

(62) Division of application No. 11/966,990, filed on Dec. 28, 2007, now abandoned.

(60) Provisional application No. 60/882,318, filed on Dec. 28, 2006.

(51) Int. Cl.
*G06F 13/00* (2006.01)

(52) U.S. Cl.
USPC .................... 711/154; 711/147; 711/130

(58) Field of Classification Search
None
See application file for complete search history.

(56) References Cited

U.S. PATENT DOCUMENTS

| 4,716,523 | A | 12/1987 | Burrus, Jr. et al. |
| 4,878,166 | A | 10/1989 | Johnson et al. |
| 6,973,484 | B1 | 12/2005 | Singhal et al. |
| 7,394,288 | B1 | 7/2008 | Agarwal |
| 7,395,443 | B1 * | 7/2008 | Kromer et al. ............... 713/324 |
| 2004/0250046 | A1 * | 12/2004 | Gonzalez et al. ............. 712/11 |
| 2006/0236072 | A1 * | 10/2006 | Lyon .......................... 711/206 |

* cited by examiner

*Primary Examiner* — Than Nguyen
(74) *Attorney, Agent, or Firm* — Fish & Richardson P.C.

(57) ABSTRACT

A processor includes a plurality of cache memories, and a plurality of processor cores, each associated with one of the cache memories. Each of at least some of the cache memories is associated with information indicating whether data stored in the cache memory is shared among multiple processor cores.

19 Claims, 4 Drawing Sheets

TRANSFERRING AND STORING DATA IN MULTICORE AND MULTIPROCESSOR ARCHITECTURES

RELATED APPLICATIONS

This application is a divisional application of U.S. application Ser. No. 11/966,990, filed Dec. 28, 2007 now abandoned, titled "TRANSFERRING AND STORING DATA IN MULTICORE AND MULTIPROCESSOR ARCHITECTURES," which claims priority to U.S. Provisional Patent Application Ser. No. 60/882,318, filed on Dec. 28, 2006, titled "TRANSFERRING AND STORING DATA IN MULTICORE AND MULTIPROCESSOR ARCHITECTURES," each of which is incorporated herein by reference.

BACKGROUND

This document relates to transferring and storing data in multicore and multiprocessor computers.

A multiple processor system can include multiple processor cores on a chip interconnected by an on-chip communication bus, or multiple discrete processor cores within a device interconnected by a communication bus, for example. Data can be transferred among the processor cores by sending data over the bus directly from a sender to a receiver, or by storing the data in a memory accessible to both the sender and receiver, for example.

Cache coherence is a useful mechanism in multiple processor systems to provide a shared memory abstraction to the programmer. When multiple processor cores cache a given shared memory location, a cache coherence problem arises because a copy of the same memory location exists in multiple caches. A cache coherence protocol guarantees that that memory location has a consistent view across all processor cores. There are many models of what a consistent view is, and one example is sequential consistency. Another is weak ordering. In each of these models, the coherence protocol prescribes a legal order in which memory locations can be acquired by and updated by various processors.

SUMMARY

This document describes various techniques, some or all of which apply equally well to a discrete system (not single chip) as well as to single chip systems such as a multicore processor. In a multicore processor, multiple processor cores are on one chip. In the description below, the terms "multicore processor" are used interchangeably with terms such as "tiled processor," or a "chip multiprocessor" (CMP), unless otherwise indicated in their context.

In one aspect, in general, a processor includes a plurality of cache memories; and a plurality of processor cores, each associated with one of the cache memories. Each of at least some of the cache memories is associated with information indicating whether data stored in the cache memory is shared among multiple processor cores.

Aspects can include one or more of the following features.

Each of at least some of the processor cores includes circuitry to replace data stored at one or more addresses in the associated cache memory using associated information indicating whether data stored at the addresses are shared among multiple processor cores.

The circuitry is configured to replace data that is shared by fewer processor cores than other data stored in the cache memory.

The circuitry is configured to replace data that is not shared by multiple processor cores before replacing data that is shared by multiple processor cores.

The one or more addresses comprise a cache line.

The information indicating whether data stored in the cache memory is shared among multiple processor cores is stored in the associated cache memory.

The processor is embodied on a single integrated circuit.

The processor further comprises main memory external to the processor.

In another aspect, in general, a method for replacing addresses in one of multiple cache memories associated with respective processor cores includes: storing information associated with the cache memory indicating whether data stored in the cache memory is shared among multiple processor cores; and replacing data stored at one or more addresses in the cache memory using associated information indicating whether data stored at the addresses are shared among multiple processor cores.

In another aspect, in general, a method for managing multiple cache memories associated with respective processing cores includes: interleaving data across cache lines of different cache memories; and accessing data in a cache line according to a hash function.

In another aspect, in general, a processor includes a plurality of cache memories; and a plurality of processor cores, each associated with one of the cache memories. Each of at least some of the processor cores are configured to access a cache memory using an instruction that includes an address having a first portion that identifies a processor core and a second portion that identifies a location within the cache memory associated with the identified processor core.

In another aspect, in general, a processor includes a plurality of processor cores; an interconnection network coupling ports of the processor cores; and a memory coupled to processor cores over the interconnection network. Each of at least some of the processor cores are configured to execute an instruction associated with an address in a range of address values, including a first portion of the range mapped to addresses in the memory and a second portion of the range mapped to ports coupled to the interconnection network.

Other features and advantages of the invention are apparent from the following description, and from the claims.

DESCRIPTION

1 Tiled Architecture Overview

Various features of parallel processing architectures are described herein, including ways of integrating a network interface efficiently, ways of integrating direct memory access, and ways of supporting cache coherence. An exemplary multicore architecture in which various techniques can be implemented is a tiled architecture illustrated in FIG. 1. in which an integrated circuit 100 (or "chip") includes an array 101 of interconnected tiles 102. Each of the tiles 102 includes a processor (or "processor core") and a switch that forwards data from other tiles to the processor and to switches of other tiles over data paths 104. In each tile, the switch is coupled to the processor so that data can be sent to or received from processors of other tiles over the communication fabric formed by the switches and data paths. The integrated circuit 100 includes other on-chip circuitry such as input/output (I/O) interface circuitry to couple data in and out of the circuit 100, and clock distribution circuitry to provide clock signals to the processors of the tiles. The tiled architecture is described in more detail in U.S. application Ser. No. 11/404,958, incorporated herein by reference.

Figure 1:
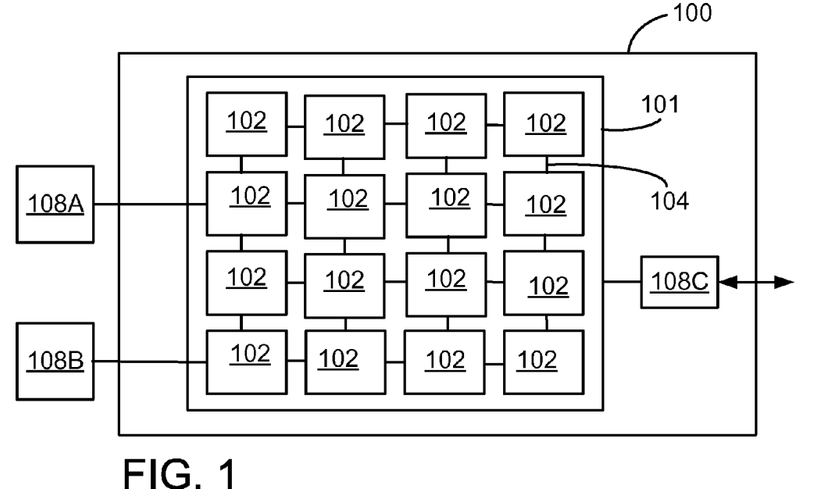
FIG. 1 is a block diagram of a tiled integrated circuit.

The data path 104 between any two tiles can include multiple "wires" (e.g., serial, parallel or fixed serial and parallel signal paths on the IC100) to support parallel channels in each direction. Optionally, specific subsets of wires between the tiles can be dedicated to different mesh networks that can operate independently.

In some examples, the network includes paths that extend to diagonal neighbors or to tiles that are multiple rows or columns away. Other examples include higher dimensional mesh topologies. For example, multiple layered integrated circuits or other three-dimensional configurations can be used to form networks in which the connections form a cube of network nodes. In some implementations, a switch coupled to a processor forwards data to and from the processor or between neighboring processors over data paths of a one-dimensional interconnection network such as ring network.

The data paths 104 from one or more tiles at the edge of the network can be coupled out of the array of tiles 101 (e.g., over I/O pins) to an on-chip device 108A, an off-chip device 108B, or a communication channel interface 108C, for example. Multiple wires of one or more parallel channels can be multiplexed down to a fewer number of pins or to a serial channel interface. For example, the wires for one or more channels can be multiplexed onto a high-speed serial link (e.g., SerDes, SPIE4-2, or SPIE5) or a memory controller interface (e.g., a memory controller for DDR, QDR SRAM, or Dynamic RAM). The memory controller can be implemented, for example, off-chip or in logic blocks within a tile or on the periphery of the integrated circuit 100.

The following exemplary implementations are described in the context of tiles that each have the same structure and functionality. Alternatively there can be multiple "tile types" each having different structure and/or functionality. For example, tiles that couple data off of the integrated circuit 100 can include additional circuitry for I/O functions. Tiles are not necessarily arranged in a regular rectilinear array.

Figure 2A:
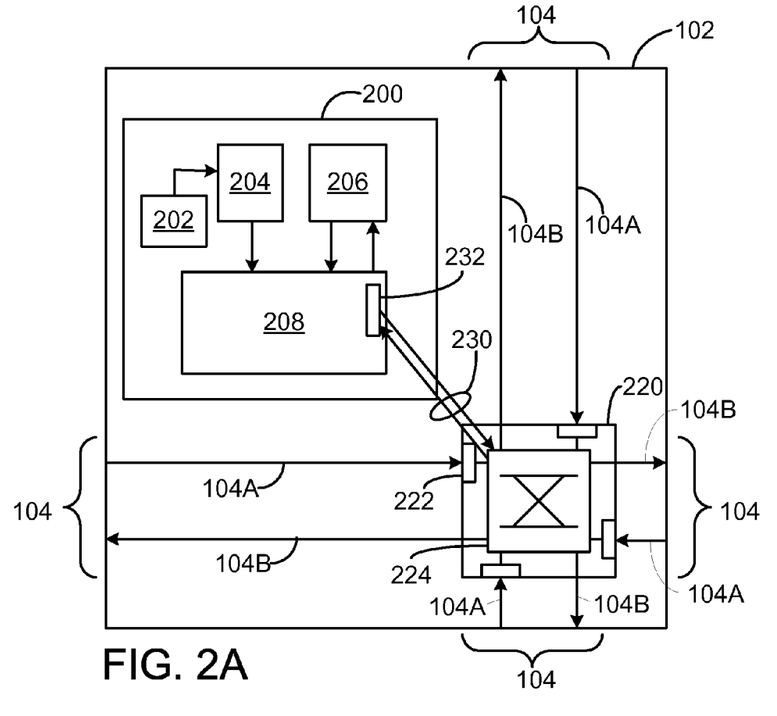
FIG. 2A is a block diagram of a tile.

Referring to FIG. 2A, a tile 102 includes a processor 200, a switch 220, and sets of incoming wires 104A and outgoing wires 104B that form the data paths 104 for communicating with neighboring tiles. The processor 200 includes a program counter 202, an instruction memory 204, a data memory 206, and a pipeline 208. Either or both of the instruction memory 204 and data memory 206 can be configured to operate as a cache for off-chip memory. The processor 200 can use any of a variety of pipelined architectures. The pipeline 208 includes pipeline registers, functional units such as one or more arithmetic logic units (ALUs), and temporary storage such as a register file. The stages in the pipeline 208 include, for example, instruction fetch and decode stages, a register fetch stage, instruction execution stages, and a write-back stage. Whether the pipeline 208 includes a single ALU or multiple ALUs, an ALU can be "split" to perform multiple operations in parallel. For example, if the ALU is a 32-bit ALU it can be split to be used as four 8-bit ALUs or two 16-bit ALUs. The processor 200 can include other types of functional units such as a multiply accumulate unit, or a vector unit.

The processor 200 can be multithreaded and/or have capabilities of a Very Long Instruction Word (VLIW) processor, a superscalar processor, or a vector processor. A VLIW processor can issue multiple instructions based on a stream of macro instructions including subinstructions designated to be executed concurrently by a compiler. A superscalar processor can issue multiple instructions by partitioning one or more instruction stream at run time to multiple functional units. A vector processor can execute instructions using multiple functional units to operate on respective components of data. A multithreaded processor can execute multiple streams of instructions (or threads) within different respective functional units, and/or within a common time-shared functional unit by switching contexts.

In some examples, the processor 200 is a coarse grain multithreaded (CGMT) processor that switches contexts on long latency events such as cache misses to memory or synchronization faults. A multithreaded processor in a tile may also switch contexts when it has to wait on the a network port. In some examples, the processor 200 is a fine grain multi-threaded (FGMT) processor that switches contexts every cycle or every few cycles whether there is a long latency event or not. In some examples, the processor 200 is a simultaneous multithreaded (SMT) processor that includes multiple functional units (e.g., in multiple pipelines) to execute instructions from multiple threads without necessarily needing to switch contexts, such as in a superscalar processor.

In some examples, the networks in the tiled array are configured to enable network ports to be shared among multiple threads running in multithreaded processors in the tiles. For example, the networks allow data for different threads to be interleaved such that, if a processor switches context while a first thread is writing to or reading from a network port, the second thread can also write to or read from the network port.

The switch 220 includes input buffers 222 for temporarily storing data arriving over incoming wires 104A, and switching circuitry 224 (e.g., a crossbar fabric) for forwarding data to outgoing wires 104B or the processor 200. The input buffering provides pipelined data channels in which data traverses a path 104 from one tile to a neighboring tile in predetermined number of clock cycles (e.g., a single clock cycle). This pipelined data transport enables the integrated circuit 100 to be scaled to a large number of tiles without needing to limit the clock rate to account for effects due to wire lengths such as propagation delay or capacitance. (Alternatively, the buffering could be at the output of the switching circuitry 224 instead of, or in addition to, the input.)

1.1 Switch Operation

Continuing to refer to FIG. 2A, a tile 102 controls operation of a switch 220 using either the processor 200, or separate switch processor dedicated to controlling the switching circuitry 224. Separating the control of the processor 200 and the switch 220 allows the processor 200 to take arbitrary data dependent branches without disturbing the routing of independent messages passing through the switch 220.

In some implementations, the switch 220 includes a switch processor that receives a stream of switch instructions for determining which input and output ports of the switching circuitry to connect in any given cycle. For example, the switch instruction includes a segment or "subinstruction" for each output port indicating to which input port it should be connected. In some implementations, the processor 200 receives a stream of compound instructions with a first instruction for execution in the pipeline 208 and a second instruction for controlling the switching circuitry 224.

The switch instructions enable efficient communication among the tiles for communication patterns that are known at compile time. This type of routing is called "static routing." An example of data that would typically use static routing are operands of an instruction to be executed on a neighboring processor.

The switch 220 also provides a form of routing called "dynamic routing" for communication patterns that are not necessarily known at compile time. In dynamic routing, circuitry in the switch 220 determines which input and output ports to connect based on the data being dynamically routed (for example, in header information). A tile can send a message to any other tile by generating the appropriate address information in the message header. The tiles along the route between the source and destination tiles use a predetermined routing approach (e.g., shortest Manhattan Routing). The number of hops along a route is deterministic but the latency depends on the congestion at each tile along the route. Examples of data traffic that would typically use dynamic routing are memory access traffic (e.g., to handle a cache miss) or interrupt messages.

The dynamic network messages can use fixed length messages, or variable length messages whose length is indicated in the header information. Alternatively, a predetermined tag can indicate the end of a variable length message. Variable length messages reduce fragmentation.

The switch 220 can include dedicated circuitry for implementing each of these static and dynamic routing approaches. For example, each tile has a set of data paths, buffers, and switching circuitry for static routing, forming a "static network" for the tiles; and each tile has a set of data paths, buffers, and switching circuitry for dynamic routing, forming a "dynamic network" for the tiles. In this way, the static and dynamic networks can operate independently. A switch for the static network is called a "static switch"; and a switch for the dynamic network is called a "dynamic switch." There can also be multiple static networks and multiple dynamic networks operating independently. For example, one of the dynamic networks can be reserved as a memory network for handling traffic between tile memories, and to/from on-chip or off-chip memories. Another network may be reserved for data associated with a "supervisory state" in which certain actions or resources area reserved for a supervisor entity.

As described above, the switch 220 is coupled to the processor 200 over processor coupling wires 230. For fast (e.g., low latency) communication between tiles of neighboring processors, the coupling wires 230 can be integrated directly into the pipeline 208. The processor 200 can communicate with the switch 220 using distinct opcodes to distinguish between accesses to the static and dynamic network ports. Alternatively, the instructions can use register names to refer to switch ports.

For example, the processor can send or receive data by writing to or reading from a register interface that is directly mapped to the input buffers 222 of the switch 220. For data going to or coming from the processor 200, a switch instruction indicates that the switch 220 should couple data to or from a selected register or bypass path of the pipeline 208 over a register mapped pipeline integrated switch interface 232. This pipeline integration allows data to be available to the switch 200 the moment an instruction is executed and the register value is available. In the next cycle the same data could appear at an input buffer of another tile.

Figure 2B:
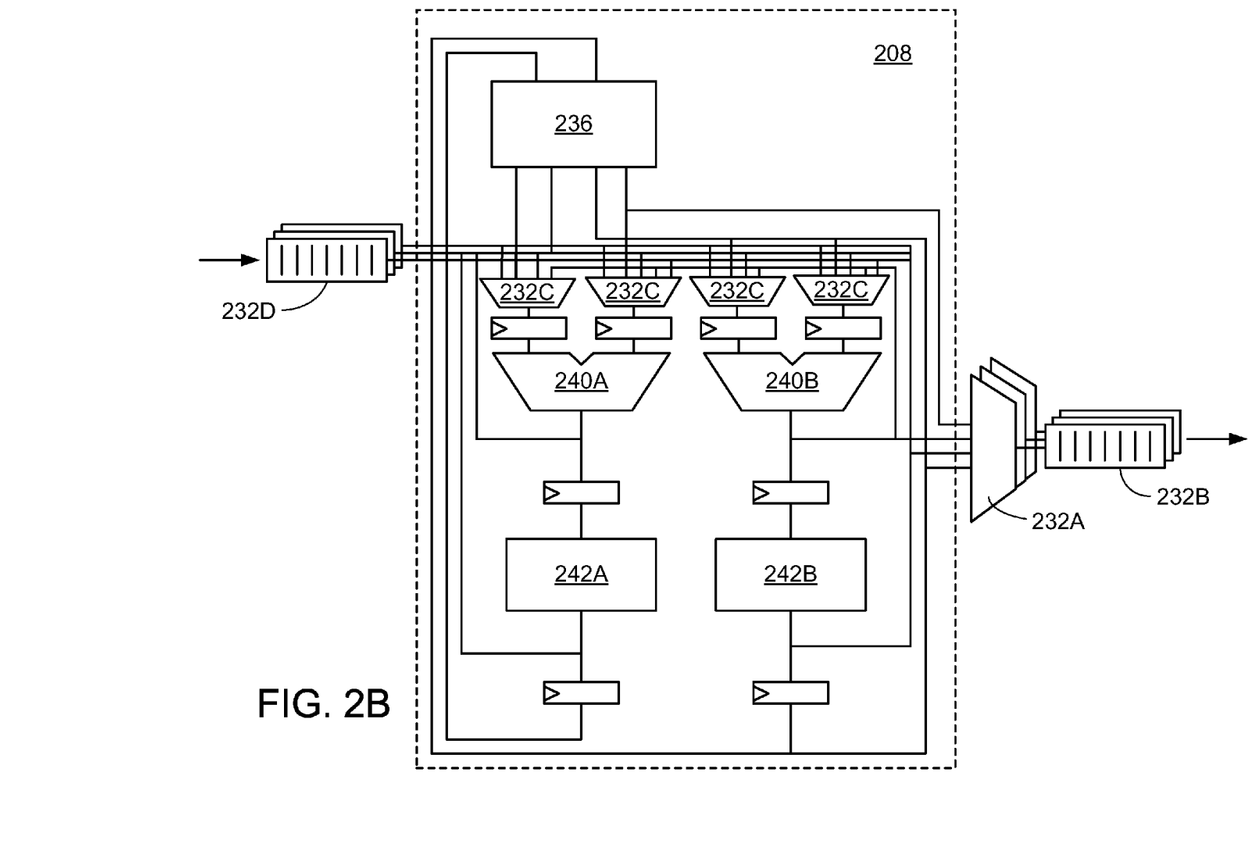
FIG. 2B is a block diagram of a pipeline.

Referring to FIG. 2B, a register mapped pipeline integrated switch interface 232 (FIG. 2A) includes a set of multiplexers 232A and output buffers 232B coupled to different output ports of the static or dynamic switch. The switch interface also includes a set of multiplexers 232C that select data from a register file 236 or any of a set of input buffers 232D coupled to different input ports of the static or dynamic switch. The multiplexers 232C feed the inputs to logic units 240A and 240B. The output buffers 232B and input buffers 232D are mapped to the name space of the register file 236. When the processor 200 (see FIG. 2A) reads from a register name mapped to a given switch port, data is taken from the corresponding input buffer 232D. When the processor 200 writes to a register name mapped to a given switch port, data is inserted into the corresponding output buffer 232B. The multiplexers 232A are able to select data from any pipeline stage (e.g., before or after the logic units 240A and 240B, or before or after functional units 242A and 242B) as soon as the value is available. If the processor 200 loads an instruction to read from an empty input buffer 232D or to write to a full output buffer 232B, the processor 200 will stall until it is able to proceed.

Figure 3A:
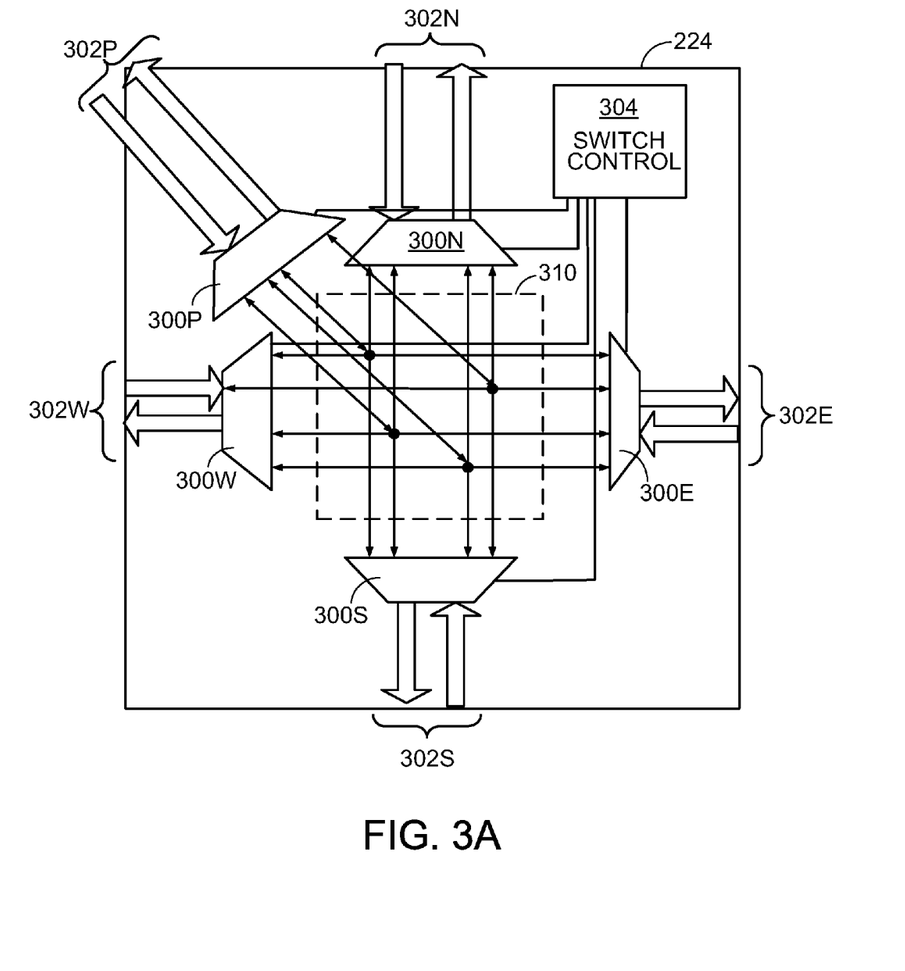
FIGS. 3A-3B are block diagrams of switching circuitry.

Referring to FIG. 3A, switching circuitry 224 includes five multiplexers 300N, 300S, 300E, 300W, 300P for coupling to the north tile, south tile, east tile, west tile, and local processor 200, respectively. Five pairs of input and output ports 302N, 302S, 302E, 302W, 302P are connected by parallel data buses to one side of the corresponding multiplexer. The other side of each multiplexer is connected to the other multiplexers over a switch fabric 310. In alternative implementations, the switching circuitry 224 additionally couples data to and from the four diagonally adjacent tiles having a total of 9 pairs of input/output ports. Each of the input and output ports is a parallel port that is wide enough (e.g., 32 bits wide) to couple a data word between the multiplexer data bus and the incoming or outgoing wires 104A and 104B or processor coupling wires 230.

A switch control module 304 selects which input port and output port are connected in a given cycle. The routing performed by the switch control module 304 depends on whether the switching circuitry 224 is part of the dynamic network or static network. For the dynamic network, the switch control module 304 includes circuitry for determining which input and output ports should be connected based on header information in the incoming data.

Figure 3B:
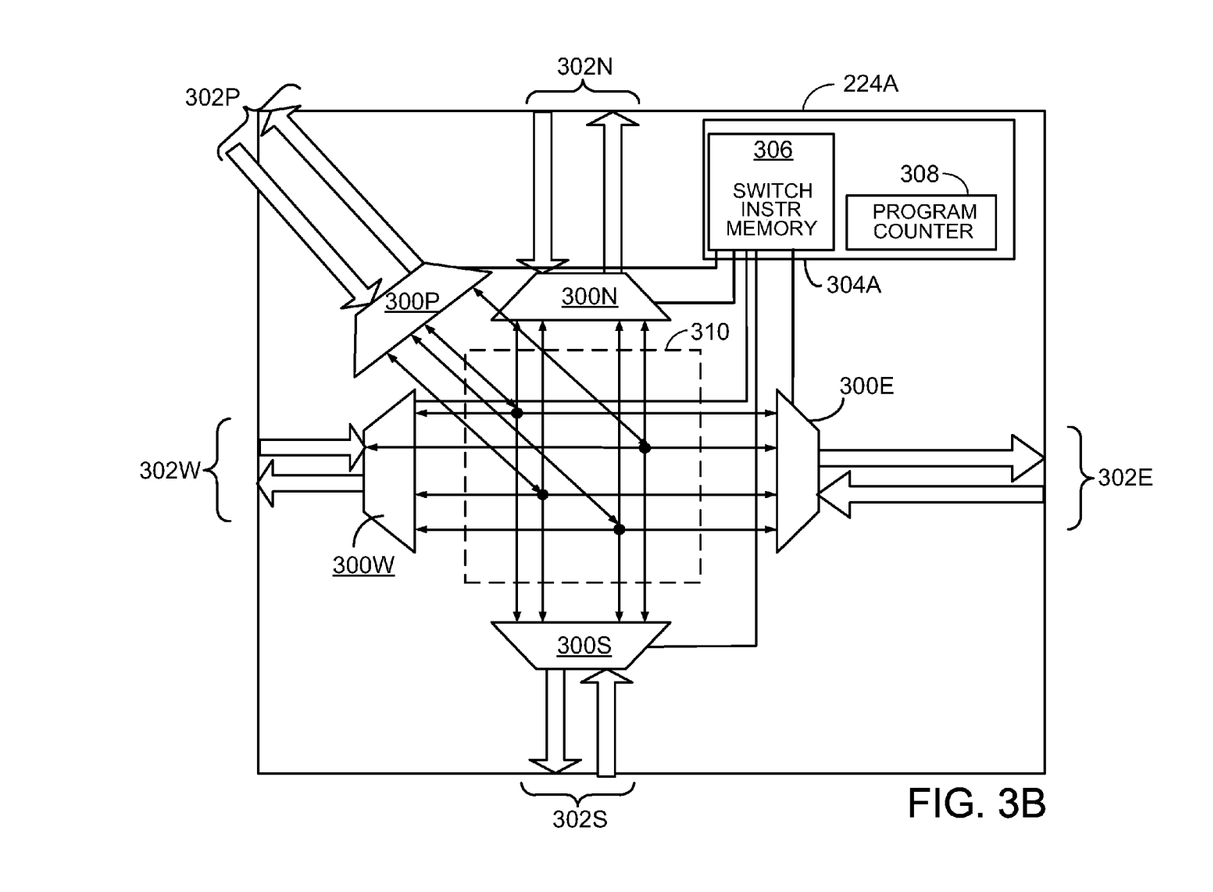

Referring to FIG. 3B, for the static network, the switch control module 304A of switching circuitry 224A includes a switch instruction memory 306 storing switch instructions that indicate which input and output ports should be connected. A switch instruction stored in the switch instruction memory 306 includes a subinstruction for each output port (in this case, five subinstructions). Each subinstruction represents a multiplexer select value which routes one of five input ports to the corresponding output port.

A program counter 308 steps through the switch instructions, interpreting control information (e.g., a condition code) in the switch instructions to perform actions such as branches or jumps based on program control flow. In a given clock cycle, the switch control module 304A can enable the multiplexers to move data independently onto any output port from any input port, including multicasting an input port to all output ports, as long as two input ports are not connected to the same output port in the same clock cycle.

The switch control module 304A is able to function as a switch processor with or without an ALU and registers. The switch control module 304A can include an ALU and registers to allow in-switch processing of in-flight messages. Optionally, the switch control module 304A can include other components such as a floating point arithmetic unit, or bit shifter, for example, to perform additional functions. In some examples, the switch control module 304A can be a VLIW-type processor and can be multithreaded.

Fast access to the on-chip interconnect in a multicore chip or tiled architecture is a key property for good performance. Some processors access input/output (I/O) mechanisms to communicate with other processors as a result of bus transactions and memory operations. Other processors can use techniques to communicate at faster speeds (at register speeds, for example, being able to access a network port in 1 or 2 cycles, and thereby to communicate a value from one core to another core in 1 to 5 cycles, for example). Such fast access is helpful for distributed ILP (instruction level parallelism) compilation. It is also helpful for efficient stream interfacing. Some processors do not have good ways of accessing the interconnect directly. Fast access to the network can be provided by techniques used in the processor microarchitecture and in its instruction set.

One technique is to memory map a direct network interface so that when the processor issues a load or a store instruction the target is a network port. This can be done by predefining a range of memory addresses to map directly into on chip network ports.

Another technique involves using special purpose registers to interface to network ports. Thus a network port read instruction can be accomplished by using an instruction that reads from a special purpose register, where that special purpose register has been mapped to a network port.

Another technique uses a special instruction to interface to a network port. When the special instruction is used, the registers it specifies actually refer to network ports and not to the regular registers. We can remap all of the regular registers or some of them as needed to on-chip network ports.

Another set of techniques relate to cache coherence in a multicore chip.

One technique relates to cache replacement. Generally, the processor prefers replacing cache lines that are not very shared over lines that are heavily shared. As one example, the cache line replacement logic attempts to replace a cache line (from a set of several cache lines) that does not have any sharing state associated with it. For example, when the logic evicts a cache line, the logic tries to evict a line that does not show any directory sharing pointers. If all cache lines have sharing state, then the logic evicts the line with the smallest number of sharers. Further if there are cache line or lines with a written state of shared data versus only read data, then the logic preferably evicts a line with written data (or alternatively, evict a line with read and shared data). In general, the logic combines knowledge about the directory state in the cache, and a least-recently-used (LRU) or replacement state normally associated with caches, in order to make an eviction choice.

Another technique is focused on interleaving the cache lines across all the cores as opposed to interleaving memory pages across all the cores. This would provide flexibility in the structure of data stored in the cache lines, allowing access to data that may not be consecutive. For example, data for an image may be stored sequentially in main memory, one row after another. Sometimes a core may execute a program that processes columns or blocks of data that are not stored consecutively in the main memory. When storing such image data in the cache memory, data for pixels in the same column can be stored in the cache lines of the same core, while data for pixels of a single row may reside in cache lines of several cores, This way, for a given operation, the image data that is being processed by a core can mostly be stored in the cache lines of the core without the need to access the cache lines of other cores.

In some implementations, the logic accesses a cache with a given hash function. If there is a cache miss, then if it is a shared address, the logic determines the home location by selecting some of the bits of the address and using those address bits to denote the specific tile on which the home for that cache line is. For example, for a 64 tile multicore, the logic use 6 bits of the address to find a home tile.

A further technique is that a processor can use two separate addressing functions into the cache. When probing the cache for a local cache request (i.e., when accessing the local cache associated with the core making the request), the full address is used. When probing the cache for a global shared cache request (i.e., when accessing the cache as a homed cache for a shared cache line), the bits that were used to select the home tile are not used in this follow on cache access.

Another technique reduces two cache accesses to one in a coherent cache system. The optimization is that if a tile requests a cache line and that cache line is also homed on that same tile (i.e., on the requesting tile), then the address (physical or virtual address) used to index the cache during the first indexing operation (private local indexing function, or "PLIF") is modified on the fly to use the second indexing operation (shared home indexing function SHIF) on the first access.

A further technique relates to the use of coalescing write buffers. Writes to shared cache lines cause a problem in coherent systems because they cause invalidations of all shared copies of that cache line. In this technique, the shared cache is augmented with an optional coalescing write buffer (CWB). The coalescing write buffer has a data field equal to the cache line size, e.g., 64B (64 bytes), a physical address CAM (content addressable memory), and a 64b (64 bit) dirty mask. Stores are buffered in the coalescing write buffer, and are sent to the home tile in a lazy fashion. The CWB can be purged on a memory fence (MF) retirement. For example, the CWB values are only sent out to update memory (and possibly cause invalidations) upon events such as a memory fence instruction, or some other synchronization instruction such as a test and set. Otherwise, stores simply write data locally in the CWB without the need to invalidate the corresponding cache lines.

2 Processor Network Integration

Many processors can be manufactured to fit on one piece of silicon. This high level of integration leads to many design options for how to have these processors effectively communicate. This section describes mechanisms that single chip multi-processors can use to communicate with. Focus is put on the addition of communication mechanisms to pre-existing instruction set architectures, but these techniques can also be applied to new instruction sets.

In this section we discuss directly accessible networks. A directly accessible network is a network that is directly connected to a processor and allows the processor to explicitly send multi-word messages or scalar values via it. An example of a directly accessible network is a dynamic network in which a processor can directly send packets having packet headers and payload data to the network, and the network will take care of delivering the packet to the appropriate receiver, which can be, e.g., a different processor or an input/output (I/O) device. Dynamic networks can have various connection topologies, for example, a mesh, a multi-dimensional mesh, and various tree topologies, for example, rings, busses, and other topologies. A directly accessible network can also be a statically routed scalar network. A statically routed scalar network includes a router in each node which executes instructions that route a given scalar word until it reaches its destination. Like in the dynamic networks, the topology can be varied. A directly accessible network can also consist of a configurable topology where the network is configured statically for long periods of time much in the way that the wires in a field programmable gate array (FPGA) are configured. A directly accessible network can also be a circuit switched network where the communications from the connected processors or I/O's can setup and tear-down particular routes through a network.

2.1 Communication via Utilizing Registers

A processor that is connected to a directly accessible network can be connected via register communication. For register based architectures, registers are a basic and fast mechanism for data storage. Thus, in a processor with directly connected networks one or multiple registers can be used to send values or messages into the one or multiple networks. Also, a single network can be interfaced via multiple registers with the aid of de-multiplexing hardware which automatically sorts inbound messages. Likewise, multiple registers can be used for outbound network traffic. These multiple registers can be used to connect to one network where by writing to different registers, the write operations can trigger different actions, such as marking a particular message with a specific length, destination, or tag.

When using registers as a mechanism to interface with directly accessible networks, these registers can be built into the register space of the instruction set architecture. This may require a new architecture in which the registers can have newly defined functions. As an alternative, a pre-existing instruction set architecture may need directly accessible networks attached to it. In many pre-existing architectures, the register space is already fully utilized. One solution to this problem is to steal a portion of the register encoding space to allow for register mapped networks. In this form of arrangement, legacy binaries may have problems executing as reads and writes to particular registers that used to store data may now enqueue and dequeue from networks. (One approach to do so would be to use binary translation to translate the old binary to a new binary in which the registers have a new function.)

An alternative to simply stealing register addressing space, in a pre-existing instruction set architecture, is to configurably use a set of registers to access the network based on some piece of state. This state can take the form of a mode bit. When the mode bit is asserted, the registers can be used as networks (or more specifically, network ports), and when deasserted, the registers can store state or have their previous uses. Alternatively, the sense on the mode bit can be reversed. This state can be thought of as a mode bit and can be stored in another register, special purpose register, memory, or can be provided due to executing at a specific address region. This mode bit can also be some implicit machine state that can be enabled and disabled via special instructions.

By having a mode bit which configurably repurposes registers for network communications, a legacy architecture can be extended to integrate network communications. When deasserted, legacy programs can execute un-altered, but when asserted, a set of registers are repurposed for network communications. The register state stored in those registers can either be saved or purged when the registers are being used as network interfaces.

2.2 Communication via Additional Registers

As discussed previously, in a pre-existing instruction set architecture directly accessible networks may need to be added. Unfortunately, for many architectures, free register encoding space may not be available. One solution to this is to add registers into the register space of the instruction set architecture. These additional network registers are not in the original register address space. In order to maintain backward compatibility, the additional networks registers can be configurably added to the architecture through the use of a mode bit or other piece of processor state. This state can be explicit or implied. An implied mode bit can for example come from executing within a specific address range.

Additional registers may simply fit in unused instruction encoding space, or an instruction set extension may add the encoding space for the network mapped registers. In fixed instruction format instruction sets, an additional set of bits for each instruction can be added to accommodate the extra encoding space needed. Alternatively, for fixed format instruction sets, an opcode prefix can be added to either all or only the instructions that read or write the networks. Lastly, it is natural to use instruction prefixes or postfixes to add extra network mapped registers to variable length instruction set architectures such as x86. This is much akin to the manner in which the REX prefix has extended the x86 instruction set to add registers to the instruction set.

2.3 Communication via Instruction Prefixes

In addition to writing to a register, a processor may want to route the result of an operation to both a register and a network or set of networks. This can be useful for multiple reasons, including for routing scalar information that needs to be utilized in both the current processor and another I/O or processor that is connected to the network fabric. One way to encode routing this data is to simply add a bit to every or a subset of instructions that indicate that the data should be routed to the network. Another alternative is to add a prefix or postfix to an instruction to indicate that the instruction should target the network.

2.4 Communication via Dedicated Instructions

Processors can interface with directly accessible networks by using dedicated instructions. For example, instructions can be added to existing instruction set architectures such as "move to network" and "move from network" which either send a single word or receive a single word from the networks respectively. Alternatively, instructions can be added that move smaller or larger amounts of data to a network in one instruction. Adding "move to network" and "move from network" instructions can also take the form where they move to a specific network as encoded by the instruction in the case that a machine has more than one network. For example "move to network 1" and "move to network 2" could move to network one and network two respectively. Also, "move to network" and "move from network" instructions can take the form where one of the operands denotes the network that is to be moved to or moved from. This is a form of network register indirection. In an example, an instruction "move to network r5, r6" would take the source, r6, and move the data contained in r6 to the network which is pointed at by the contents of r5.

An alternative to having register indirect network naming is to have a register pointed to as the source/destination directly denote the network that should be read/written. In an example, "move to network r5, r6" could mean that the data stored in register r6 should be moved to the network "5" which has been denoted by targeting register "r5".

The techniques in this section can also be extended to adding more than "move to network" and "move from network" instructions that target networks. Instead, an instruction set can be extended to add a subset of its current instructions where the subset reads from or targets directly attached networks. For instance, if an instruction set contains an addition instruction such as "add r5, r6, r7" where this instruction reads register r6 and register r7 adds the values stored in the registers together and stores the result in register r5, the instruction set can be extended with an instruction add_nd. add_nd is an instruction which operates the same as the add instruction except the destination is interpreted as a network destination. Thus "add_nd r5, r6, r7" would add the value stored in register r6 with the value stored in register r7 and deposit the result in network "5". Alternatively, r5 could contain an indirect pointer to a particular network.

2.5 Communication via Special Purpose Registers

Many processor architectures contain special purpose register (SPRs) or control registers (CRs) that are used for rarely used processor state. What sets SPRs or CRs apart from general purpose registers is that they typically require special instructions to read or write them. This is in contrast to general purpose registers that can be read or written by most arithmetic instructions. In order to add directly accessible networks into processors with SPRs or CRs, the SPRs or CRs' themselves can be used as the means to communicate with the networks. In effect the network or networks are mapped into the SPR or CR namespace. An example of this can be shown with an instruction "move to special purpose register 1234, r5". This instruction takes the value stored in register r5 and moves it to the special purpose register 1234 which happens to map to a network. Likewise the instruction "move from special purpose register r7, 1234" dequeues data from the network and deposits it into register r7.

2.6 Communication via Network Controlling Memory Regions

Directly accessible networks can interface to a processor via a memory mapped interface. For instance, to communicate with the network, a specific set of memory addresses can be set aside to communicate with the network. Thus, simply by executing load or store instructions to particular addresses, data can be written to or read from a directly accessible network. In an example, assume that address 0x1234 denotes access to a network. By executing a store to address 0x1234, the written data is transported to the particular network denoted by address 0x1234. Likewise, executing a load from address 0x1234 dequeues from the particular network denoted by address 0x1234.

2.7 Flag Communication via Networks

Many instruction set architectures utilize condition codes or flags, as they are also known, for conditional branching and storage of processor state. When adding directly accessible networks to instruction set architectures that utilize condition codes or flags, an efficient manner to move flags to and from the network may be required. One way to efficiently move flags is to have instructions that move from a network directly to the flag registers. Likewise having an instruction which directly moves the flags to the network are useful. An example instruction would be Flags-To-Network (ftn). ftn takes the flag register and in one instruction (and in one cycle) moves the flag registers to the directly accessible network. The network can be named either directly by having varying versions of ftn, where ftn0, ftn1, ftn2, etc., move to networks 0, 1, and 2, respectively. Alternatively, ftn can take a register as an operand which contains a pointer to the actual network. Or the register identifier can signify a particular network to move the flags to. Likewise an instruction Flags-From-Network (ffn) takes data from the network and loads it into the flag register. Like ftn, if there are multiple directly connected networks, the network can be named via the instruction, indirectly, or via a register alias or immediate field.

When using flags, it is often advantageous to divide the flags into subsets as needed. An example of this is the zero flag that many architectures have. The zero flag indicates that the result of a computation is zero. When communicating flag information via directly accessible networks, often only a single flag or a subset of the complete flags needs to be communicated. Thus, ftn and ffn can be extended to move to the network or move from the network a subset of the flags. For example, this can be advantageous with ffn because it does not modify the balance of the flags not explicitly named to be modified. Likewise, this can be advantageous for ftn because it can align the flag in a manner that would otherwise require instructions on the receiving node to align and mask the data. An example instruction for moving the zero flag to the network is called Flag-To-Network-Zero (ftnz). This instruction moves the zero flag to the network and packs the flag into the lowest ordered bit on the network. Likewise, Flag-From-Network-Zero (ffnz) moves the lowest ordered bit from the network into the zero flag without modifying the other flags. This idea can be extended to all of the flags that an architecture contains and it can also be extended to subsets of the flag set.

2.8 Small Width Networks for Flags

When using directly accessible networks to communicate branch conditions or flags, these data types are typically boolean values or very narrow values. An optimization that can be performed on the networks is to narrow the width of the network. This narrowing can be all the way to a single bit and hence be designed for communication of boolean values.

Another way to efficiently use wide width networks to carry flags is to dynamically use only a portion of the network datapath. This can be achieved by using instructions like ftnz which indicates to the network that only the lowest ordered bit needs to be carried throughout the network. By having multi-granularity in the networks, the energy needed to move the data bits around can be significantly reduced. Because the network does not need to transmit all of the higher-ordered bits when only transmitting a single flag, the upper bits of a multi-bit network can be clock gated to reduce power.

2.9 Network Access Blocking

When integrating a pre-existing processor and instruction set architecture with directly accessible networks, the question arises what to do when the processor reads from the network and no data is available. A similar question arises with writing to the network; what should occur if the processor attempts to write to the network, but the outbound data queue is full. A good solution is to stall on data being unavailable on network reads. No matter the access method, reading from the network stalls the processor until data is available. When data is available the instruction stream resumes. Likewise, when writing to the network, no matter the method, if the output queue is full, the processor should stall. When the output queue contains space in it, the processor unstalls and the data is written to the network.

2.10 Network Availability Polling

When integrating a pre-existing processor and instruction set architecture with directly accessible networks, a user may want to use the directly accessible networks in a polling model. When using directly accessible networks in a polling model, a user wishes to determine if a particular operation will stall the processor. Thus, a register, special purpose register, or instruction can be used to determine if a reading of or writing to the network will stall. In an example, one way to determine if data is available to be read from the network is to issue the Poll-Data-Available (pda) instruction. pda returns a predetermined value if data is available such as one and returns a different predetermined value such as zero if no data is available. The pda instruction does not modify the network queue state and does not block. Likewise, it is useful to determine if a network write would stall the main processor. One solution to this is the Poll-Output-Free (pof) instruction. pof returns a predetermined value such as one if space is available in the named network queue and returns a differing value such as zero if the network output port is full.

2.11 Network Non Destructive Read

In a similar manner to availability polling, we can have a network instruction called a non destructive read, or NDR.

When an NDR is executed, the network port is read (for example, through a register, a special purpose register, special instruction, or memory location, etc) and the value is returned. However, the value is left in the network port without dequeuing it. This way, the value can be read multiple times, until a normal network read is issued, which is a destructive read, which dequeues the value from the network. The benefit of such a scheme is that a regular register need not be used to store the value if it is needed multiple times.

2.12 Network Early Out

Many processors pipeline computations and many times have variable length operations. For instance, it is common for multiplies to take more time to compute than additions. Because of this, data is typically ready in different pipeline stages of a processor pipeline. If the data from that particular operation is destined for a directly accessible network, the result data does not need to wait for the longest operation to complete before being enqueued into the network. For instance, if a processor contains an addition function which takes one cycle and a multiplication function which takes three cycles to execute when pipelined, the processor can implement network early out such that results from addition operations are sent to the network after only one cycle and do not have to wait until the end of the pipeline to be sent to the network. By forwarding data to the network expeditiously, the latency of network communications can be reduced. A processor that implements network early out may also elect to maintain network ordering of data words that target a network. For instance, if a long latency operation such as a multiply operation targets a network is quickly followed by a short latency operation such as an addition, the network early out mechanism can preserve operation ordering. In order to accomplish this, the results from short latency operations can be buffered up and sent later in the pipeline. In effect this is a sliding network commit point where the context of an instruction determines at what point in the pipeline its results are enqueued to the network.

2.13 Endian Conversion in Network

On-chip directly accessible networks are often used to connect between multiple processors and also between processors and I/O devices. These devices do not always use the same native bit-endianness. For example, networks can use big-endian while processors, such as an x86 processor, utilize little-endian data storage formats. One solution for this problem is to configure network channels to exchange (or convert) the endianness of data that transits a particular channel. In other words, a little endian data format can be converted to a big endian format, or vice versa. In effect, this would allow two processors to pass data over a directly accessible network channel and have one be little-endian and the other be big-endian without extra data formatting or instructions executed in either processor. This reduces the overall instruction counts on the processors.

3 Direct Memory Access Integration

When integrating many processors on a single chip, efficient mechanisms are needed to move data between two processors and between a processor and memory. In this section, a processor core, its cache structure, and portion of the network infrastructure (e.g., switch, ports, and portion of incoming and outgoing wires) will be referred to as a tile. One way to efficiently accomplish this is by the use of direct memory access (DMA) engines integrated inside of each tile. DMA engines can be used to move data between different memory addresses without directly requiring instructions to be executed to accomplish every memory move.

3.1 Operation of an In-tile DMA Engine

A DMA engine can provide an independent thread of control and offload address computation off of a tile processor. The DMA engine is capable of computing addresses and accessing memory in the form of both loading and storing to memory. One possible implementation of a DMA engine is for a DMA engine to have an address calculation unit, a load unit and a store unit. The control of the DMA engine can then be loaded with the starting from address, the starting end address, the transaction length, and the stride of the transaction. Once activated, the DMA engine will run moving data from the start from address to the start end address then it will increment the current location pointers by the stride and continue until the transaction length is met. After the transaction completes, the DMA engine may interrupt the in-tile processor to indicate that the DMA transaction has completed. Alternatively the DMA transaction can be polled for a completion status from the tile processor. The DMA engine can also deal with unaligned data, thus providing an efficient manner to re-align data 3.2 Sources and Destinations When moving data, the source and destination addresses can be in differing locations. One place that the data can be is in the in-tile's cache. Another place that the data can be is in system main memory or other system shared cache structure. Finally, the data can be located in another tile's cache. Because data can be in another tile's cache, a DMA engine can be used as an efficient manner to move data from one tile to another tile without much processor overhead. Also, the data can be pushed or pulled to or from another tile's cache.

3.3 Interfacing

An in-tile DMA engine can be interfaced with in several ways. One way is through the use of special purpose registers. These registers can be mapped into the special purpose or control register space of the in-tile processor. By using these registers, the DMA engine can have its control registers read and written. An example of these control registers include the starting from address, the starting end address, the transaction length, and the stride of the transaction. The in-tile processor can also inspect the state of these registers and control registers related to the DMA engine to determine if a transaction has completed. Also, control registers can be used to start and stop pending DMA transactions.

Other mechanisms can be used by a tile-processor to configure and control a DMA engine. Most notably, the DMA engine's control can be memory mapped. Thus, reading and writing specific memory locations can be used to control and read the status of a tile-DMA engine. Lastly, a DMA engine can be controlled by special instructions being added to an instruction set architecture. For example, instructions such as Run-DMA-Engine (rde) and Stop-DMA-Engine (sde) can be used to start and stop the DMA engine respectively. Instructions can also be added to an in-tile processor to set and read the address registers of a DMA engine.

When transactions complete in DMA engines, it is often desirable for the DMA engine to signal to the controlling processor that the transaction has completed. Also, if a transaction does not successfully complete, a DMA engine also needs to signal this to a controlling processor to indicate that further attention is needed. One way to signal this information in a tiled context is to have a DMA engine raise an interrupt on the in-tile processor to indicate that either the transaction has completed or that an error has occurred.

3.4 Queues of DMA Transactions

An extension of a basic in-tile DMA engine is to allow an in-tile DMA engine to have a list of transfers that need to occur. By batching up transactions, an in-tile processor needs to communicate with the DMA engine less frequently than if it had to communicate with the DMA engine for each transfer. The list of transactions to be completed can be enqueued into an operation queue or alternatively can be described in transaction description structures stored in memory.

4 Cache Coherence

This section relates to a cache coherence protocol, shared/private cache hierarchy, and microarchitecture for a tile architecture chip.

An exemplary protocol and microarchitecture implements a fully cache coherence protocol in hardware, leveraging mechanisms such as SNC based load stores, TLB based redirecting of home locations of cache lines, etc. described in more detail in U.S. application Ser. No. 11/404,958, incorporated herein by reference. The scheme uses write through core caches and coalescing write buffers to achieve high performance while at the same time keeping the design complexity low. The scheme exploits the relaxed memory consistency model of the architecture to simplify the handling of writes, and treats the existing L2 simultaneously as both a private L2 and a distributed shared L3 cache. It can also be built as an improvement to the Proxy Caching approach described in U.S. Application No. 60/827,473, incorporated herein by reference. Shared addresses and memory locations are optionally allocated using a special memory allocation function such as shared malloc.

4.1 Overview of the Coherence Approach

The following features can be included in an approach for providing cache coherence.

The physical address space is distributed among the tiles/L2 caches such that every physical address has a unique home tile. (Alternatively, this can be done on virtual addresses, without loss of generality. Generally, any scheme that distributes or interleaves cache lines among the cores at a cache line granularity or at a user choosable granularity can be used). This can be done by applying some function to the physical address (or virtual address) or through the TLB. For clarity, the rest of this discussion assumes that the home tile ID is PA<11:6>. In other words, bits 11 through 6 of the physical address. (Other bits can also be used).

We can retain a two level cache hierarchy in the core, rather than add a third level of cache. (Alternatively, if there are more than 2 levels of cache in the core, then this scheme applies to the highest level of cache hierarchy in a core). The second level cache size is optionally increased to 128K. The tile count remains constant at, for example, 64.

The second level cache is augmented with an optional coalescing write buffer (CWB). The coalescing write buffer has a 64B (64 byte) data field, a physical address CAM, and a 64b dirty mask (The specific data sizes are used for clarity only. The sizes can be modified). For example, the CWB might store the addresses written into, and the values written into them. When coalescing, subsequent writes to the same addresses overwrite the previous values.

Keeping the store values in the CWB without having them go to the memory system is useful because a write issued into the memory system causes the coherence protocol to potentially invalidate all the other copies. By storing the values locally in a CWB, the memory invalidates can be postponed to a later time.

The first level cache is a private cache. It maps the entire global PA (physical address) space (as in the current design).

The existing second level cache becomes a combined shared/private cache. It caches data in two ways: (a) as part of the distributed, shared L2 (think of this as an L3), and (b) data requested by this core but homed elsewhere.

Thus, there are two separate addressing functions into the L2. When probing the cache for a local L2 request, the full PA is used. This indexing function is called the private local indexing function (or PLIF). When probing the cache for a global L2 request, bits PA<11:6> are not used. The latter function used for homed shared addresses is called the shared home indexing function (or SHIF). In other words, the L2 maps the entire PA space for the local core, but maps only 1/64th (or 1/P of the address space, if there are P cores) of the PA space as part of the global shared cache. The benefit of indexing the cache after deleting the PA<11:6> addresses (or in general, the bits that are used to determine which tile that address is homed in) is that every cache set in a given cache can be used for homing shared addresses. If the bits are not deleted, then certain sets of the cache will never be used for shared references. In other words, only addresses with a given PA<11:6> will arrive at this cache, and these will map, generally, to only 1/64th of all the cache sets (or in general, 1/Pth of all cache sets if there are P tiles).

Stores are buffered in the coalescing write buffer, and are sent to the home tile in a lazy fashion. The CWB is purged on memory fence (MF) retirement. In other words, the CWB values are sent out to update memory upon events such as a memory fence instruction, or some other synchronization instruction such as a test and set.

All stores copy out through the CWB. This protocol does not use an exclusive state.

Although they are described jointly, we note that the concepts of CWB and two-pronged cache accesses can be used separately.

Sharing information is kept at the shared distributed L2, with a single sharing field per L2 cache block. We can optimize how we store sharing information by using 1 bit in the sharing field to reflect more than one core processor. For example, the sharing field can use 1 bit per four processors, indicating if one or more processors in the group share the block.

The shared distributed L2 is inclusive: if block X is in a core cache, then a copy of it is in the home L2. On a displacement from the shared distributed L2, the core caches are invalidated.

A new physical network can be added to carry invalidate messages. Invalidate acknowledgements flow over the MDN. Alternatively, logical channels can be used to emulate multiple physical networks.

On a write from a core, the data is merged at the home L2, and the sharers (if any) are invalidated. The home L2 does not expose the newly written data until the invalidate acknowledgment messages are received from all sharers.

The coherence point for block X is the home L2 for block X.

4.2 Simple Read Flow

On a read, a tile first checks its private level 1 and level 2 caches. The index function used is the PLIF. If hit, data is returned. If miss, based on PA<11:6>, the tile sends a read request over the TDN to the home tile. The home tile is indicated by PA<11:6>. In some cases, the home tile might be the same tile, in which case the cache is reaccessed with the shared home index function SHIF. The home tile checks its L2 for the requested block, and assuming hit, returns the data to the requesting tile. The home L2 adds the requesting tile to the sharing list.

4.3 Simple Write Flow

When a write is pushed out of a tile's coalescing write buffer, the masked write (i.e., which specific byte or word is to be updated) is sent to the home L2. The home L2 merges the write with the background data (i.e., the data previously contained in that cache line), invalidates any sharers, and collects invalidate acknowledgements.

4.4 Modifications

The above scheme can be modified in several ways.

4.4.1 Local Home Modification

The above scheme with two indexing functions has a small problem in that a given memory line might be present in two different cache lines in the same cache in a given tile. We note that this is not a correctness issue, rather it is not a great use of cache resources. Therefore, there is a modification in which if a tile requests a cache line and that cache line is also homed on that same tile (i.e., on the requesting tile), then the PA used to index the L2 cache during the private indexing PLIF operation is modified on the fly to use the shared home indexing function SHIF on the first access.

This modification of the indexing function can be accomplished in several ways. For example, it can be done by comparing the index bits for homing (PA<11:6>) against the index bits corresponding to this tile before accessing the L2 cache. If the bits are the same, then go ahead and use the SHIF rather than the PLIF.

We can also make a further modification. We can start indexing the L2 cache with the usual set of bits (i.e., the PLIF) and in parallel compare PA<11:6> with a register containing the index bits corresponding to this tile. If there is a match, then we abort the cache read that has begun with the PLIF, and reissue the address according to the shared home indexing function SHIF to the cache. The cache access to L2 takes a 1 cycle hit in this case. We can also overlap the compare operation with the previous cache access. In other words, as the address is coming into the L2 cache, its home bits can be compared somewhere along the way and a bit can be set along with the address that says that this address can use the SHIF.

The above modifications also have the advantage that they reduce the number of cach accesses from two to one.

4.4.2 Directory Victim Cache

One possible performance problem with the previous scheme is the fact that evictions on home tiles induce evictions in tiles sharing the data. Because we do not store directory information in memory, when a shared line is evicted from its home tile, all copies cached at tiles sharing the line are invalidated. If we don't do this, it is possible that a tile might end up with stale data. Here is one possible solution. The next subsection describes another solution.

When a shared cache line is evicted from the home L2, the directory information for the evicted line is placed in the Directory Victim Cache (DVC). The DVC contains only directory information (no data), and is indexed via PA (physical address). When an incoming snoop arrives at a home tile and misses in the L2, a request is sent to memory to fetch the data. Additionally, the DVC is accessed and if the PA hits in the DVC, the directory information is restored to the L2 and removed from the DVC. When an address, A, must be evicted from the DVC, the tiles sharing address A are sent invalidate messages over the invalidate network. Basically, the DVC allows directory information for a shared line to be cached even when the data is not present in the home tile, delaying the global invalidation of shared data until eviction from the DVC. Ideally, the DVC is small and highly associative (for example, a content addressable memory, or a CAM).

4.4.3 Directory Aware Cache Replacement Policy

Another solution to the problem of evictions is to implement a cache replacement policy that is "Directory Aware". The high level idea is to prefer replacing lines that are not very shared over lines that are heavily shared. For example, consider the case where we have a 2-way associative L2. An incoming snoop misses in the L2, sends a request to memory and must choose a line for eviction. Both ways have valid data, however, the directory information in way 1 says no tiles are sharing the data, while the directory information in way 0 says several tiles are sharing the data. The replacement policy should choose way 1 as the way for eviction, resulting in fewer cache line invalidations.

The same technique can be easily generalized to any set-associativity. In general, the design is as follows. The cache line replacement logic attempts to replace a cache line (from a set with many cache lines) which does not have any sharing state associated with it. In other words, when you evict a cache line, try to evict a line that does not show any directory sharing pointers.

If all cache lines have sharing state, then evict the line with the smallest number of sharers. Further if there are cache line or lines with a written state of shared data versus only read data, then preferably evict a line with written data (or alternatively, evict a line with read and shared data).

In general, the scheme combines knowledge about the directory state in the cache, and the LRU or replacement state normally associated with caches, in order to make an eviction choice.

4.4.4 Sharing Cache State

We can modify the coherence scheme further by using the cache state that is used to store directory state for multiple purposes. For example, during an eviction or other situation in which invalidates are happening, we need to keep track of the number of acknowledgements that have been returned from other tiles. This can be stored as a counter in the same set of bits that are used to store directory information. Each time an acknowledgement comes back, the counter is incremented (or decremented).

We can also keep a small buffer that contains a list of outstanding transactions along with an acknowledgement counter associated with each. This information can also be stored in one of the memory storage locations normally used for cache and memory access, such as the memory retry FIFO.

5 Powerblock at Startup

The following modification can be used for low power operation of a tiled processor. In one usage model, a user does not plan to use some number of the tiles at all. This information is known at bootup or startup time.

Normally, the power block logic associated with a tile is able to turn off a tile and then turn it on when needed. Turn on can be difficult and so it helps to eliminate the turn on feature.

In one exemplary design we eliminate the "wake up" feature, which greatly reduces the bug and schedule risk. So, shortly after boot, the customers code would execute the power block instruction (for example, using a write to special purpose register SPR R) on the unused tiles, and they would be then turned down for good.

There are some variants to this. For example, the customer could wake up all tiles by asserting power up reset (or hard reset, the pin reset, or some other similar global line). The user might also perform a power-cycle to reset the on or off state of tiles.

It is to be understood that the foregoing description is intended to illustrate and not to limit the scope of the invention, which is defined by the scope of the appended claims. Other embodiments are within the scope of the following claims.

What is claimed is:

1. A processor comprising:
    a plurality of cache memories,
    an array of interconnected tiles, each tile comprising a processor core, at least one of the tiles comprising a copy engine to perform a memory-to-memory copy operation based on a source begin address, a source end address, a transaction length, and a stride of transaction and each processor core being associated with one of the cache memories;

with the memory-to-memory copy operation copying first segments of data from a source region starting from the begin address, skipping over second segments of data in between the first segments of data, and stopping at the end address, and each of the first segments of data that is copied has a length equal to the transaction length, and each of the second segments of data that is not copied has a length equal to the stride of transaction, and with the source region having the data being copied comprises at least one of a region in a cache memory associated with the tile having the copy engine, a region in a cache memory associated with a tile different from the tile having the copy engine, a region in a cache memory shared by multiple tiles, and a region in a main memory.

2. The processor of claim 1, in which the copy engine performs the memory-to-memory copy operation when the source begin address, source end address, transaction length, and stride of transaction are written into registers without further instruction from the processor core.

3. The processor of claim 1, wherein the copy engine performs the memory-to-memory copy operation when the source begin address, source end address, transaction length, and stride of transaction are written into designated memory regions without further instruction from the processor core.

4. The processor of claim 1, wherein the copy engine issues load and store operations to memory to implement the memory-to-memory copy operation, the load and store operations issued by the copy engine having the same instruction code as load and store operations issued by the processor core.

5. The processor of claim 1, wherein a source region of the memory-to-memory copy operation comprises at least two of a region in a cache memory associated with the tile having the copy engine, a region in a cache memory associated with a tile different from the tile having the copy engine, a region in a cache memory shared by multiple tiles, and a region in a main memory.

6. The processor of claim 1, wherein a destination region of the memory-to-memory copy operation comprises at least one of a region in a cache memory associated with the tile having the copy engine, a region in a cache memory associated with a tile different from the tile having the copy engine, a region in a cache memory shared by multiple tiles, and a region in a main memory.

7. The processor of claim 6, wherein a destination region of the memory-to-memory copy operation comprises at least two of a region in a cache memory associated with the tile having the copy engine, a region in a cache memory associated with a tile different from the tile having the copy engine, a region in a cache memory shared by multiple tiles, and a region in a main memory.

8. The processor of claim 1, wherein the memory-to-memory copy operation comprises a direct memory access operation.

9. The processor of claim 1, wherein every tile comprises a copy engine.

10. A method comprising:
performing a memory-to-memory copy operation when a begin address, an end address, a transaction length, and a stride value are written into predetermined registers without requiring further instructions from a processor core, including copying first segments of data from a source region starting from the begin address and stopping at the end address, and skipping over second segments of data in between the first segments of data, with each of the first segments of data that is copied has a length equal to the transaction length, and each of the second segments of data that is not copied has a length equal to the stride value, and with the source region having the data being copied comprises at least one of a region in a cache memory associated with the tile having the copy engine, a region in a cache memory associated with a tile different from the tile having the copy engine, a region in a cache memory shared by multiple tiles, and a region in a main memory.

11. The method of claim 10, comprising performing a second memory-to-memory copy operation, in which the transaction length associated with the second memory-to-memory copy operation is different from the transaction length associated with the first memory-to-memory copy operation.

12. The method of claim 10, wherein the memory-to-memory copy operation is performed when the source begin address, source end address, transaction length, and stride of transaction are written into registers without further instruction from the processor core.

13. The method of claim 10, wherein the memory-to-memory copy operation is performed when the source begin address, source end address, transaction length, and stride of transaction are written into designated memory regions without further instruction from the processor core.

14. The method of claim 10, wherein a copy engine issues load and store operations to memory to implement the memory-to-memory copy operation, the load and store operations issued by the copy engine having the same instruction code as load and store operations issued by the processor core.

15. The method of claim 10, wherein a source region of the memory-to-memory copy operation comprises at least two of a region in a cache memory associated with the tile having the copy engine, a region in a cache memory associated with a tile different from the tile having the copy engine, a region in a cache memory shared by multiple tiles, and a region in a main memory.

16. The method of claim 10, wherein a destination region of the memory-to-memory copy operation comprises at least one of a region in a cache memory associated with the tile having the copy engine, a region in a cache memory associated with a tile different from the tile having the copy engine, a region in a cache memory shared by multiple tiles, and a region in a main memory.

17. The method of claim 16, wherein a destination region of the memory-to-memory copy operation comprises at least two of a region in a cache memory associated with the tile having the copy engine, a region in a cache memory associated with a tile different from the tile having the copy engine, a region in a cache memory shared by multiple tiles, and a region in a main memory.

18. The method of claim 10, wherein the memory-to-memory copy operation comprises a direct memory access operation.

19. The method of claim 10, wherein every tile comprises a copy engine.

* * * * *